UNITED STATES PATENT OFFICE.

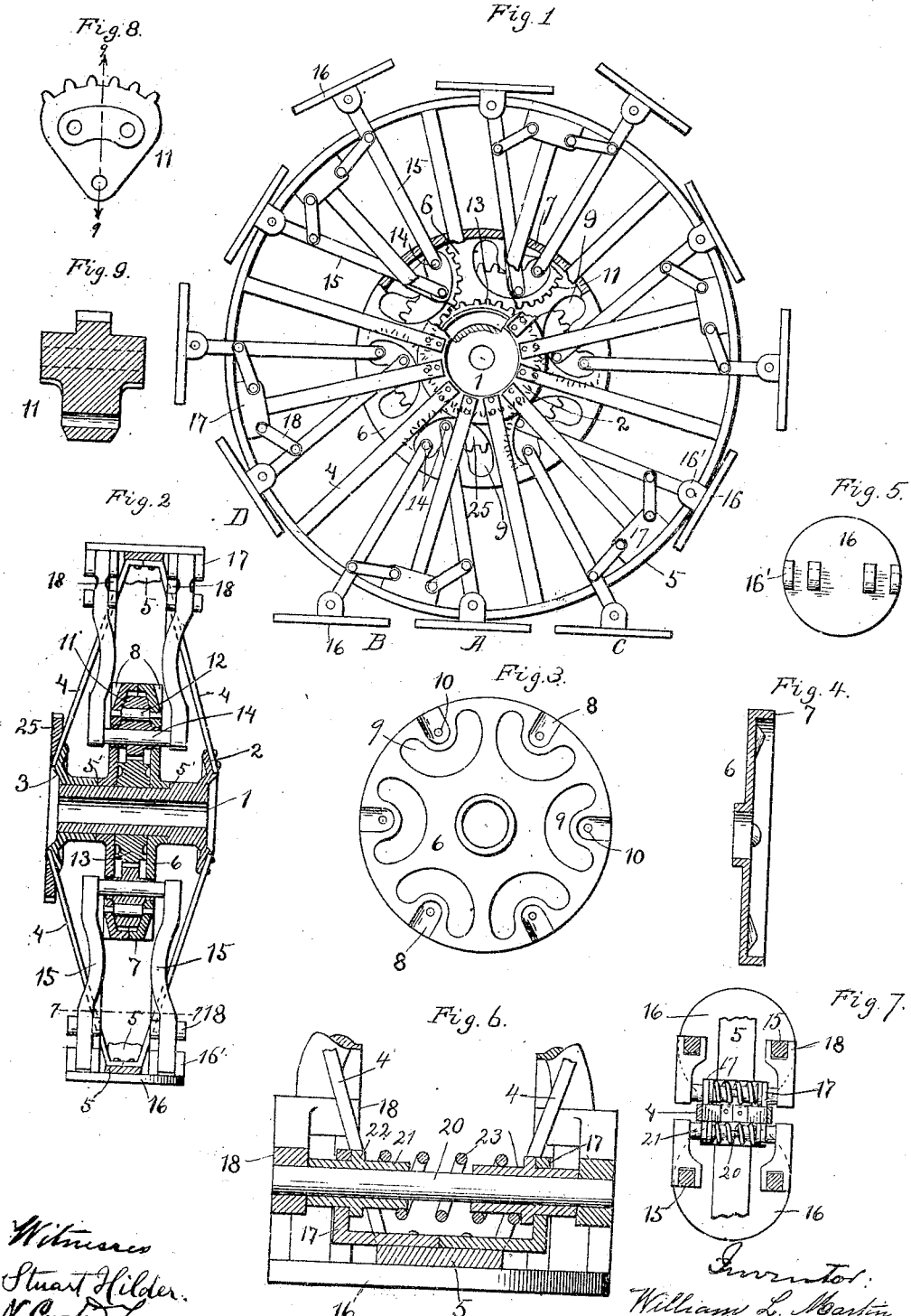
W. L. MARTIN.
TRACTION WHEEL.
APPLICATION FILED JAN. 16, 1907.
902,426.
Patented Oct. 27, 1908.

WILLIAM L. MARTIN, OF CHICAGO, ILLINOIS.

TRACTION-WHEEL.

No. 902,426.

Specification of Letters Patent.

Patented Oct. 27, 1908.

Application filed January 16, 1907. Serial No. 352,549.

*To all whom it may concern:*

Be it known that I, WILLIAM L. MARTIN, a citizen of the United States, residing at Chicago, in the county of Cook and State of Illinois, have invented certain new and useful Improvements in Traction-Wheels, of which the following is a specification, reference being had therein to the accompanying drawing.
My invention relates to wheels for traction engines, heavy trucks, harvesters, etc., and its object is to provide a construction in which a large bearing surface will be provided in a substantially horizontal plane, so that the hub of the vehicle will be carried without rising or falling. Provision is also made for permitting the wheel to move easily in a curved path while the "feet" or carrying members remain stationary upon the ground. I attain these objects by the construction shown in the drawings, in which:

Figure 1 is a side elevation of the wheel; Fig. 2 is a diametral section; Fig. 3 a side elevation, and Fig. 4 a vertical section of one of the housing disks hereinafter referred to; Fig. 5 a plan of one of the feet or bearing disks, and Fig. 6 is a transverse sectional view, on an enlarged scale, taken through the rim of the wheel and adjacent parts, and illustrating the mechanism for permitting a lateral yielding of the feet relative to the wheel frame. Fig. 7 is a sectional view on the line 7—7 of Fig. 2. Fig. 8 is a side elevation of one of the toothed sectors, detached. Fig. 9 is a section of said sector taken on the line 9—9 of Fig. 8.

The wheel proper consists of a rigid frame comprising a hub 1, having an integral spider 2 at one end and a separable spider 3 at the opposite end, to facilitate assembling the wheel. It is of course understood that this latter spider is secured to the barrel of the hub after the wheel is assembled. 4 are the spokes and 5 the tire; the parts thus far described constituting an ordinary form of metal wheel.

Rigidly mounted concentrically between shoulders 5', 5' on the hub and removable spider, respectively, are a pair of housing disks 6, having flanges 7 for protecting the parts inclosed by said disks, and recesses 8, for a purpose hereinafter to be described. The housing disks are also provided with a series of arcuate slots 9 and with bearings 10 for a series of toothed sectors 11, substantially triangular in outline, and each secured in the bearings 10 by a pin or shaft 12, passing through the center of oscillation of the sector.

Mounted loosely upon the hub 1 is a gear 13 with which meshes each of the sectors 11. Six such sectors are shown in the drawing; but it is understood that the number may be varied, if desired.

Passing through each of the free corners of each sector, concentrically with its pivot and toothed periphery, is a shaft 41, to each end of which shaft is secured a movable spoke or leg 15; said spokes being preferably inwardly curved as shown in Fig. 2. These spokes extend substantially radially outward and beyond the tire of the wheel frame and are pivotally attached at 16' in pairs to the feet or bearing disks 16 in the manner shown.

Attached to the tire 5, as at 17, are angle-pieces, in which are pivoted pairs of links 18, 18; the opposite ends of said links being pivotally attached to the spokes, as shown. The pivots 20 of the links 18 pass through sleeves 21 (Fig. 6), each of which sleeves has a collar 22 about midway between its ends. These collars are, when assembled, located inside the vertical flanges of the angle-pieces 17, and the axially alined pairs of sleeves carry between their collars spiral springs 23, of suitable strength; the whole construction constituting means which permit the disks 16 and tire 5 to move relatively when the disks contact with the ground and the vehicle is turning; while said disks and tire are again centered by the springs 23 as soon as each disk leaves the ground. The length of the shafts or pivots 14 is such that they readily move endwise through the sectors 11, as may be necessary; the inward curve of the spokes being received in the recesses 8 of the housings 6.

It will be noted that each sector 11 carries four movable spokes two on each side and governs two disks 16, and that all the sectors must move in unison by reason of their meshing with the common "master" gear 13.

Referring to Fig. 1, the operation is as follows: When the wheel as a whole passes from above the disk in position A to that in position B, the transfer of weight from A to B will rock about its pivot the sector to which these two disks are connected; gradually retracting B and protruding A, by the cycloidal movement of the sector and maintaining the disks continually in a line tangent to the periphery of the wheel, until disk A has reached the position C. Since all the sectors move in unison, the disk at C will then be gradually retracted, as it leaves the ground, and that at D protruded until it reaches position B.

It will be readily understood that gearing 25 may be attached to the spokes 4 whereby power may be transmitted to the wheel, as in traction engines; or by means of which the wheel may drive any desired mechanism, as in harvesters.

What I claim is:

1. In a wheel, a rotatable frame, bearing members movable in respect thereto, a system of pivotally connected links between each two of pairs of said bearing members to which each member of the pair is pivotally connected and which is in turn pivotally carried by the rotatable frame, and positive motion transmitting means between corresponding parts of said link systems for causing the systems to operate synchronously, whereby the transfer of weight from one member to its adjacent member acts to maintain any two of said members in a straight line which is at a substantially constant distance from the center of the wheel.

2. In a wheel, a frame, a series of sectors mounted thereon, movable bearing members connected to said sectors, and motion transmitting means for said sectors whereby a plurality of said bearing members are maintained in a line substantially tangent to the periphery of said wheel, while said bearing members carry the weight of the wheel.

3. In a wheel, a frame, a plurality of rods carrying bearing members movable substantially radially relatively to said frame, and yielding means for permitting said rods to also move in a line substantially parallel to the axis of the wheel.

4. In a wheel, a frame, a series of movable sectors mounted concentrically thereon, spokes carrying bearing disks at their free ends, and a central gear meshing with each of said sectors, the spokes being connected to the sectors and adapted to impart an oscillatory motion thereto.

5. In a wheel, a frame, a series of movable sectors mounted concentrically thereon, spokes connected to said sectors and carrying bearing disks at their free ends, links connecting an intermediate point of each of said spokes to the periphery of the wheel frame, and means for connecting said sectors each to each.

6. In a wheel, a frame, a housing mounted concentrically on said frame, a series of toothed sectors pivoted in said housing, a gear meshing with each of said sectors, movable spokes connected to said sectors and having bearing disks at their opposite ends, and links connecting intermediate points of said spokes to the periphery of the wheel frame.

7. In a wheel, a rotatable frame, bearing members movable in respect thereto, and motion transmitting means interconnecting all of the bearing members, whereby the relative movement of the bearing members is such that at certain positions the bearing members lie in a series of straight lines, each straight line passing through three adjacent bearing members.

8. In a wheel, the combination of a rotatable frame, bearing members movable with respect thereto and motion transmitting means between one bearing member and another bearing member bearing such relation to the former bearing member that the former is in engagement with the ground on the advancing side of the wheel when the latter is in engagement with the ground on the rear side of the wheel, the motion transmitting means being adapted to convert the radially inward movement of the former member into a radially outward movement of the latter member, the distance of the wheel center from the ground being constant for all positions of the bearing members.

In testimony whereof I affix my signature, in presence of two witnesses.

WILLIAM L. MARTIN.

Witnesses:
HARRY D. HANSON,
A. E. WIDMER.